UNITED STATES PATENT OFFICE.

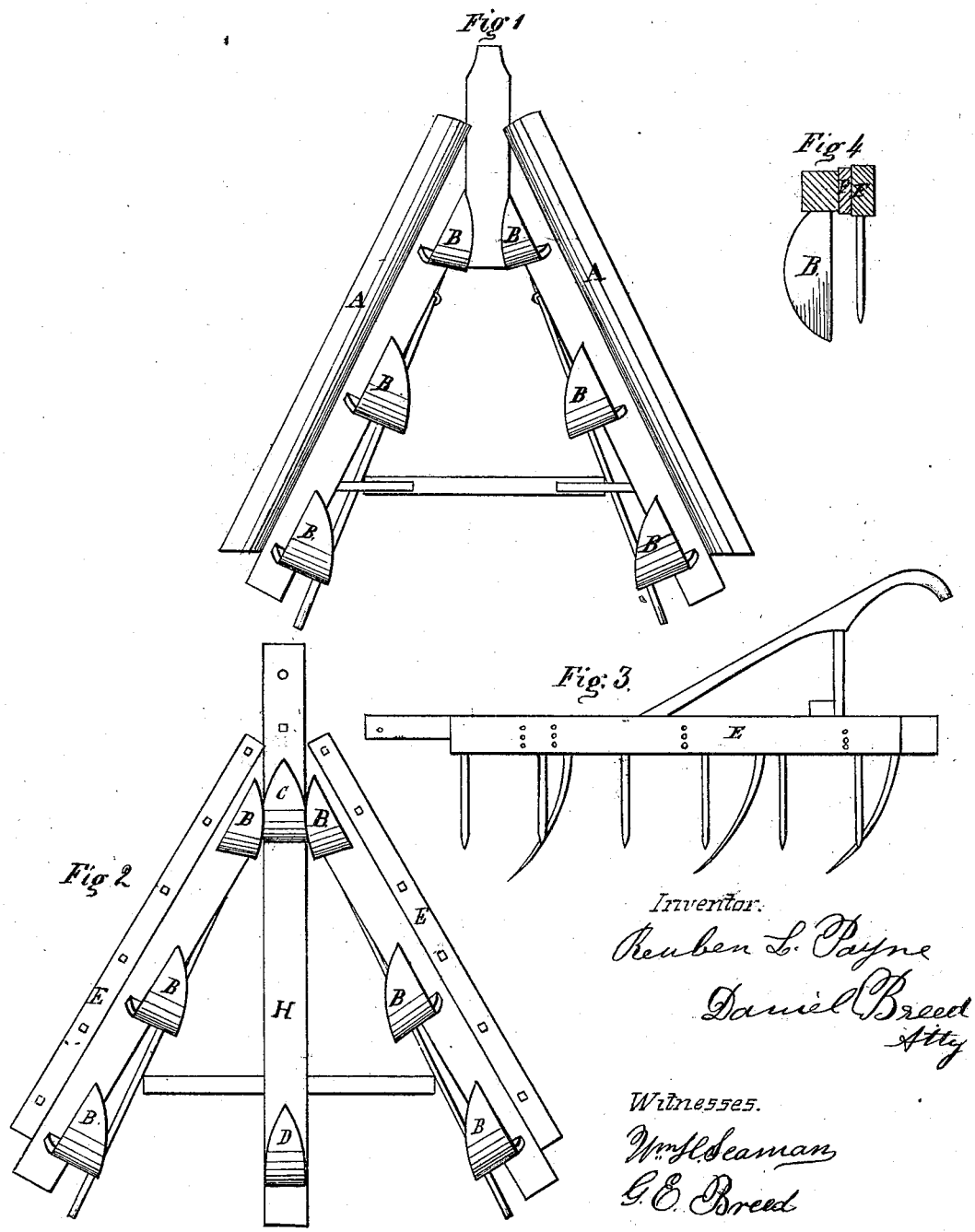

REUBEN L. PAYNE, OF RICEVILLE, VIRGINIA.

IMPROVEMENT IN CULTIVATORS.

Specification forming part of Letters Patent No. 106,956, dated August 30, 1870.

*To all whom it may concern:*

Be it known that I, REUBEN L. PAYNE, of Riceville, in the county of Pittsylvania and State of Virginia, have invented a new and useful Improvement in Multiform or Labor-Saving Cultivators; and I do hereby declare that the following is a full and exact description thereof, reference being had to the accompanying drawings, and to the letters of reference marked thereon.

My invention consists in a peculiar construction and arrangement of multiform cultivators.

In the drawings, Figure 1 is a bottom view of my cultivator with scrapers attached. Fig. 2 is a bottom view with the scrapers removed and a harrow attached. Fig. 3 is a side view with the harrow but not the scraper. Fig. 4 is a detached section.

In the first figure the form of cultivator is intended for cultivating cotton, corn, and tobacco. The scrapers A are intended for scraping off the top of the ground, and thus destroying the weeds. The cultivator-teeth B are so set as to work deep and thoroughly loosen up the ground and turn it toward the row, working both sides of the row at the same time. The form represented in Fig. 2 has a center piece, H, and is intended for preparing ground for cotton and corn, or for tobacco if the rear tooth, D, is taken out. The forward tooth, C, opens a furrow, which is again closed by the action of teeth B turning the furrows toward the middle, and thus bedding up a row, which is finally opened by the broad tooth D in the rear. The harrow E breaks the clods to pieces or turns them out of the way.

By reversing the teeth B so as to turn their furrows outward the cultivator may be used with one horse between the rows, either to finish bedding up or to cultivate. Thus the scraper or harrow may be used when desired, or both may be removed.

A strip, F, Fig. 4, may be inserted to throw the harrow or scrapers away from the teeth B, if desired.

The shape of the teeth B is very peculiar, one edge being nearly in a perpendicular plane, while the other is curved to form the point and working-share. These teeth may be made to turn the earth either to the right or left, as desired. The point is curved forward more than usual, and the tooth is long, so as to work deep in the ground. They are made of wrought metal and driven hot into a mold or compress, to give them the proper set and temper, yet they might be made of cast metal.

Having described my invention, I claim—

1. The arrangement of the interchangeable scrapers A with harrows E and center piece, H, and with the right and left hand teeth B, substantially in the manner and for the purposes set forth.

2. The teeth B, constructed substantially as set forth.

REUBEN L. PAYNE.

Witnesses:
 DANIEL BREED,
 EDM. F. BROWN.